United States Patent
Zavalkovsky et al.

(10) Patent No.: US 7,493,394 B2
(45) Date of Patent: Feb. 17, 2009

(54) DYNAMIC TIMEOUT IN A CLIENT-SERVER SYSTEM

(75) Inventors: Arthur Zavalkovsky, Netanya (IL); Jeremy Stieglitz, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 10/749,897

(22) Filed: Dec. 31, 2003

(65) Prior Publication Data

US 2005/0198190 A1    Sep. 8, 2005

(51) Int. Cl.
*G06F 15/173* (2006.01)
(52) U.S. Cl. .................. 709/225; 709/223; 709/224
(58) Field of Classification Search .......... 709/203, 709/207, 223–225
See application file for complete search history.

(56) References Cited

U.S. PATENT DOCUMENTS

| | | | |
|---|---|---|---|
| 5,471,564 A | 11/1995 | Dennis et al. | |
| 5,664,091 A | 9/1997 | Keen | |
| 5,699,511 A | 12/1997 | Porcaro et al. | |
| 5,719,882 A | 2/1998 | Ellis | |
| 5,894,583 A | 4/1999 | Johnson et al. | |
| 5,907,681 A * | 5/1999 | Bates et al. | 709/228 |
| 6,016,508 A * | 1/2000 | Chu et al. | 709/223 |
| 6,275,858 B1 * | 8/2001 | Bates et al. | 709/228 |
| 6,363,496 B1 | 3/2002 | Kwiat | |
| 6,405,337 B1 | 6/2002 | Grohn et al. | |
| 6,446,225 B1 | 9/2002 | Robsman et al. | |
| 6,473,399 B1 | 10/2002 | Johansson et al. | |
| 6,526,433 B1 | 2/2003 | Chang et al. | |
| 6,687,859 B2 | 2/2004 | Robsman et al. | |
| 7,085,932 B1 * | 8/2006 | Morgan, III | 713/182 |
| 7,127,485 B2 * | 10/2006 | Caruso et al. | 709/203 |
| 7,284,062 B2 * | 10/2007 | Krantz et al. | 709/229 |

* cited by examiner

*Primary Examiner*—Moustafa M Meky
*Assistant Examiner*—Hussein Elchanti
(74) *Attorney, Agent, or Firm*—Hickman Palermo Truong & Becker LLP (57) ABSTRACT

The invention provides techniques for dynamic timeout including the steps of receiving a request from a requestor; determining whether an interim message should be sent to the requestor; and, if the interim message should be sent to the requestor, sending to the requestor the interim message referring to the request. Techniques are also provided for dynamic timeout including steps of sending a request to a server; receiving an interim message from the server, where the interim message contains one or more response-related items; and determining whether to change a timeout value based on the one or more response-related items in the interim message.

31 Claims, 5 Drawing Sheets

DYNAMIC TIMEOUT IN A CLIENT-SERVER SYSTEM

FIELD OF THE INVENTION

The present invention relates to client-server systems in a network. The invention specifically relates to dynamic timeout in a client-server system.

BACKGROUND OF THE INVENTION

In client-server computer systems, clients rely on servers to provide needed services. In such systems, server response time can vary due to workload at the server. In some cases, a server's speed of response to a particular request is not fixed or deterministic and is dictated by the processing needed to respond to the request, communications that need to be performed in order to respond to the request, and the backlog or queue of requests on the server. For example, an authentication, authorization, and accounting (AAA) server may need to request user information from an Lightweight Directory Access Protocol (LDAP) server in order to process a Remote Authentication Dial-In User Service (RADIUS) Access Request.

Given the variable time needed for a server to satisfy a request and the fact that a server may also crash or otherwise be unable to respond to a request from a client, many clients are implemented with timeout mechanisms. A "timeout mechanism" allows the client to wait an appropriate amount of time before resending a request, sending the request to another server, or any other appropriate action to take based on the assumption that the server will not send a timely response.

One approach for implementing a timeout mechanism, the fixed timeout approach, is to use a fixed timeout on the client. In the fixed timeout approach, a client sends a request, and if a response to the request does not come within a predefined period of time, then the client "times out". After timing out, the client will either resend the request to the same server or will send the request to another server ("failover" to another server).

In the fixed timeout approach, given a particular request, the client will wait time T for a response from the server and will retry the request R times, again waiting time T for each retry. In a situation where the server cannot respond in time T to the request, either because the server is down (has failed), or the processing of the request has taken too long, then the client waits for a total time of R*T without a response to the request and then fails over to another server. In some approaches, the time T varies with the number of times the request has been resent. In Dynamic Host Configuration Protocol (DHCP), for example, the timeout values increase logarithmically with the number of retries performed.

A problem with the timeout approach is that the client wastes the total time to failover of R*T. Another problem with the timeout approach is that failover time is constant or predefined for a particular client. Consider, for example, a client C that sends a request to a server S. The client has a fixed timeout of T seconds configured. In the case where the server takes T+1 seconds to respond to the request, the client will timeout after T seconds and resend the message to the server S. This wastes time on the client, since it will retry the request R times, taking a total of R*T seconds before failing over to another server. It also wastes R*(T+1) seconds on the server which receives R requests and spends T+1 seconds on each request. Ideally, the client would only send one request and would wait for the response that comes at T+1 seconds. Then, the server would only have to process one request.

Therefore, there is clearly a need for a system that enables clients to wait an appropriate amount of time for responses to requests sent to servers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for dynamic timeout in a client-server system is described. In the following description, for the purposes of explanation, numerous specific details are set forth in order to provide a thorough understanding of the present invention. It will be apparent to one with ordinary skill in the art, however, that the present invention may be practiced without these specific details. In other instances, well-known structures and devices are shown in block diagram form in order to avoid unnecessarily obscuring the present invention.

General Overview

The needs identified in the foregoing Background, and other needs and objects that will become apparent for the following description, are achieved in the present invention, which includes, in one aspect, techniques for dynamic timeout comprising machine-implemented steps of receiving a request from a requestor at a server or a process communicatively coupled thereto; determining whether an interim message should be sent to the requestor; and, if the interim message should be sent to the requester, sending to the requestor the interim message referring to the request, where the interim message contains one or more response-related items.

In a related feature, the one or more response-related items include one or more of the following: a time estimate related to sending a response to the request; time estimate related to sending a subsequent interim message related to the request; an indication that the request has been received by the server or a process communicatively coupled thereto, an indication that describing whether the request is well formatted; an indication of the state that the server is in; if processing the request involves multiple steps, an indication of the which steps of the multiple steps have already been performed; and if processing the request involves sending a second request to an external resource server, an indication of the status of the second request.

In a related feature, the steps are performed by an AAA server and the requestor is an AAA client; the request is a RADIUS Access Request message; and the interim message is a RADIUS Access Challenge message that contains the one or more response-related items in a Vendor Specific Attribute in the RADIUS Access Challenge message. In another related feature, the steps described herein are performed by an AAA server and the requestor is an EAP supplicant, the request is an EAP Request, and the interim message is an EAP Notification message that contains the one or more response-related items.

In a related feature, the step of determining whether the interim message should be sent to the requestor includes determining whether one or more of the following has occurred: the request has been received; the request has been successfully parsed; the server has begun processing the request; CPU usage of the server meets certain criteria; memory usage of the server meets certain criteria; and a queue of messages awaiting response by the server meets certain criteria. In a related feature, the step of determining whether the interim message should be sent to the requestor includes determining whether a second request has been sent to an external resource server. In a related feature, the step of determining whether the interim message should be sent to the requestor includes determining whether a second response to a second request has been received at the server from an external resource server.

In another aspect, techniques are provided for dynamic timeout comprising machine-implemented steps of sending a request to a server; receiving an interim message from the server, where the interim message contains one or more response-related items; and determining whether to change a timeout value based on the one or more response-related items in the interim message.

In a related feature, the one or more response-related items include one or more of: time estimate related to sending a response to the request; time estimate related to sending a subsequent interim message related to the request; an indication that the request has been received by the server or a process communicatively coupled thereto, an indication describing whether the request is well formatted; an indication of the state that the server is in; if processing the request involves multiple steps, an indication of the which steps of the multiple steps have already been performed; and if processing the request involves sending a second request to an external resource server, an indication of the status of the second request.

In a related feature, the steps are performed by an AAA client and the server is an AAA server, the request is a RADIUS Access Request message, and the interim message is a RADIUS Access Challenge message that contains one or more response-related items in a Vendor Specific Attribute in the RADIUS Access Challenge message. In a related feature, the steps are performed by an EAP supplicant and the server is an AAA server, the request is an EAP Request, and the interim message is an EAP Notification message that contains one or more response-related items.

In another aspect, a machine-readable medium if provided for carrying one or more sequences of instructions for dynamic timeout, which instructions, when executed by one or more processors, cause the one or more processors to carry out the steps described herein.

In another aspect, an apparatus is provided for dynamic timeout, and the apparatus includes means for performing the steps described herein.

In another aspect, an apparatus is provided for dynamic timeout, and the apparatus includes a network interface that is coupled to a data network for receiving one or more packet flows therefrom; a processor; one or more stored sequences of instructions which, when executed by the processor, cause the processor to carry out the steps described herein.

Structural Overview

Figure 1:
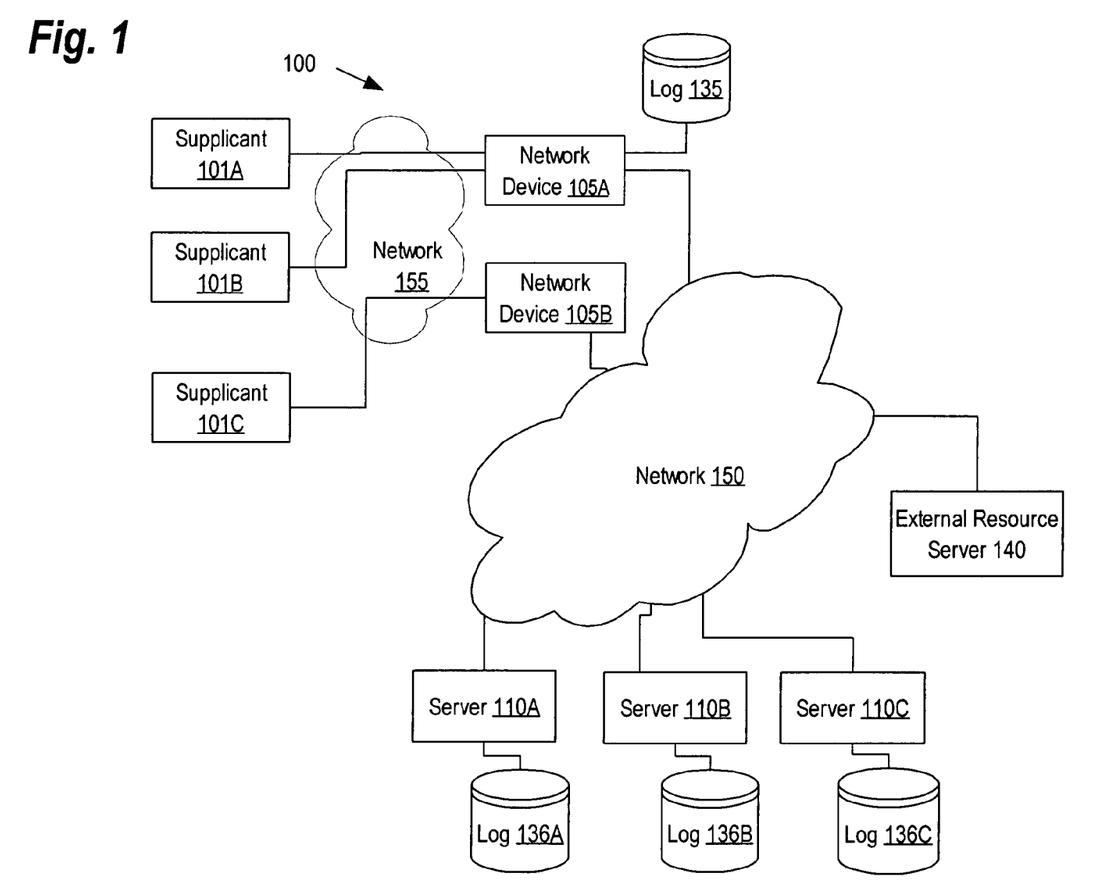
FIG. 1 depicts a block diagram of example architectural components and layout of a network system.

FIG. 1 depicts a block diagram of example architectural components and layout of a network system.

One or more supplicants 101A, 101B, 101C are communicatively coupled to network devices 105A, 105B. In one embodiment, communication of supplicants 101A, 101B, 101C with network devices 105A, 105B is over a network 155. In various embodiments, the network 155 is a wireless network, dial up access, the Internet, a local area network (LAN), or any other communication network. In various embodiments, the network device 105A, 105B are wireless access points, virtual private network devices, network access servers, switches, routers, or any other appropriate devices.

The network devices 105A, 105B are communicatively coupled to a network 150. In various embodiments, the network 150 is a wireless network, dial up access, the Internet, or any other appropriate communications network. The network device 105A is also communicatively coupled to a log 135. In various embodiments, the log is a database, a flat file, or any other appropriate storage.

One or more servers 110A, 110B, 110C are communicatively coupled to the network 150 and to respective logs 136A, 136B, 136C. In various embodiments, the servers are AAA servers, application servers, database servers, or any other appropriate servers. According to one embodiment of the techniques herein described, the servers 110A, 110B, and 110C are AAA servers and the network devices 105A, 105B are AAA clients. In another embodiment, servers 110A, 110B, 110C are AAA servers and supplicants 101A, 101B, 101C are EAP supplicants.

One or more external resource servers 140 are communicatively coupled to the network 150. The one or more resource servers 140 can be identity information servers, directory servers, or any other appropriate resource servers.

Consider this example of a functioning system of FIG. 1. Network device 105A acts as an access regulator for a supplicant 101A, controlling what the supplicant 101A can reach in the rest of the system 100. The network device 105A accounts for all of the activity that passes through it via a log 135. When supplicant 101A requests a service from a server 110A in the system 100, the network device 105A communicates with the servers 110A to forward the request from supplicant 101A through the network 150. All activity at the server 110A is accounted for in a log 136A.

Functional Overview

The following functional description requires no particular hardware, operating system, software system, or other detail for an implementation. Additionally, the flow diagrams presented are examples of possible algorithmic flow and in no way limit the scope of the invention. Embodiments of the invention can be practiced in many ways in many disparate hardware and software environments and using different algorithmic flow.

Interim Messages

In a scenario where a client sends a request to a server and awaits a response from the server, an interim message is a message that provides information from the server regarding what the server is doing to process the request before a substantive response to the request can be sent. In various embodiments, the interim message is constructed based on the processing that has already been performed on the request or based on the processing yet to be performed on the request. For example, the interim message may contain information stating that 50% of the processing on the request has been done or that a particular operation is yet to be performed.

In various embodiments, the interim message is communicated by an AAA server, and conforms to RADIUS, Terminal Access Controller Access Control System (TACACS+), Diameter, Extensible Authentication Protocol (EAP), Kerberos, hypertext transfer protocol (HTTP), Blocks Extensible Exchange Protocol (BEEP), or any other appropriate protocol. In various embodiments, the interim message contains information related to validation of the request, time estimates indicating when the server expects to send a substantive response, and time estimates related to sending a subsequent interim message. In related embodiments, the contained information is contained in an EAP Notification or a Vendor Specific Attribute (VSA) within a RADIUS Access Challenge message. In one embodiment, the information in the interim message is encoded in any appropriate format, including key-value pairs.

Determining when to Send an Interim Message

Figure 2:
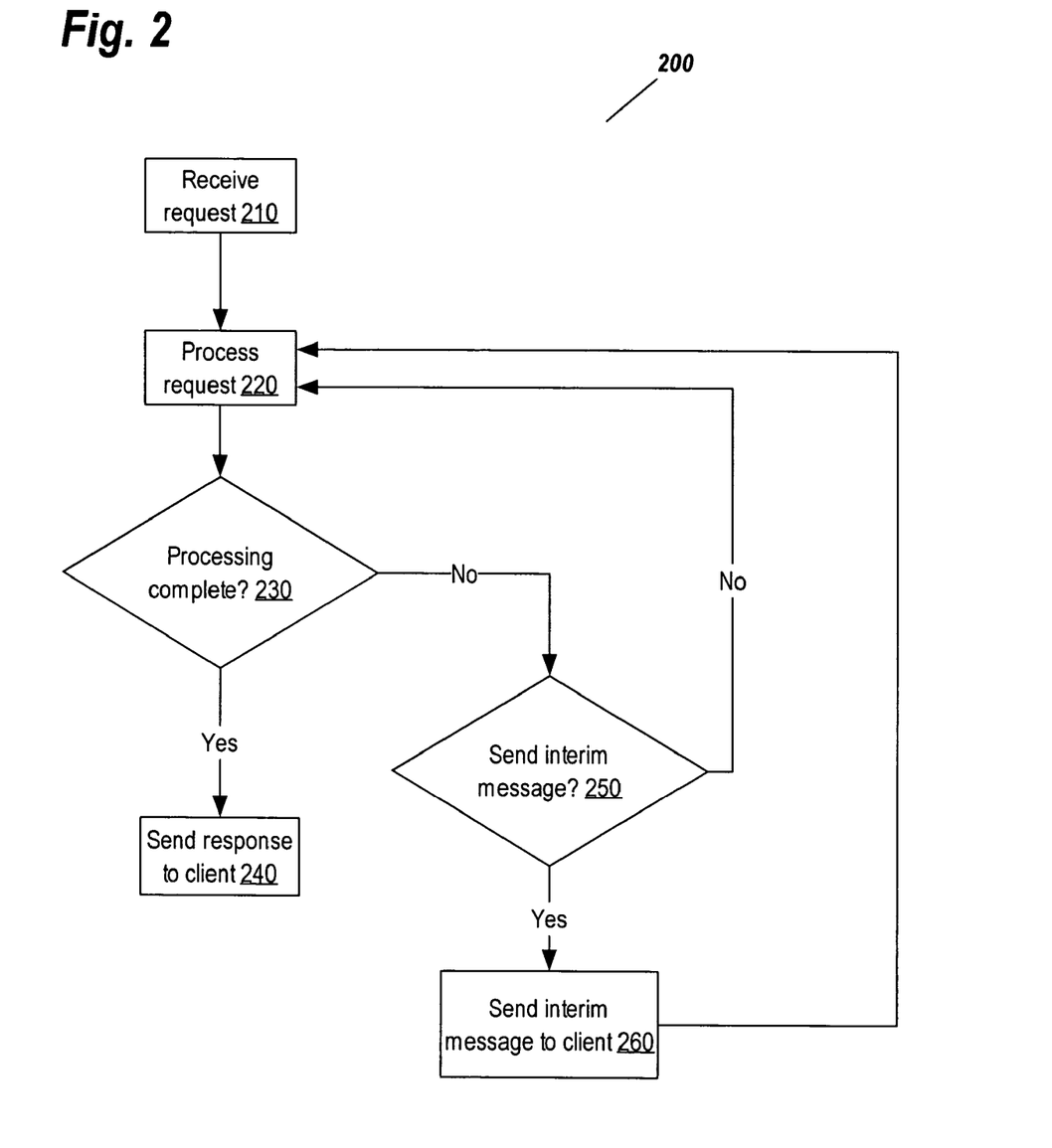
FIG. 2 depicts a flow diagram of an example method for determining when to send an interim message.

FIG. 2 depicts a flow diagram of an example method for determining when to send an interim message.

In step 210, a request is received. In various embodiments, the request is received by a server or any process communicatively coupled thereto. In various embodiments, the request is received via a network, FTP, HTTP, HTTPS, TCP/IP sockets, or other appropriate data transport mechanisms. In various embodiments, the request conforms to RADIUS, TACACS+, Diameter, EAP, Kerberos, HTTP, BEEP or any other appropriate protocol. In various embodiments, the request is a RADIUS Authorization Request message, an EAP Request, or any other appropriate request. In various embodiments, the request is received by a client or supplicant.

In the context of FIG. 1 where, for example, a server 110A is an AAA server and a network device 105A is an AAA client, the server 110A receives a RADIUS Access Request from a network device 105A over a network 150.

In step 220, the request is processed. In various embodiments, the request is processed by the server or any process communicatively coupled thereto. In various embodiments, processing the request involves performing operations based on the content of the request or sending messages to other servers or services based on the content of the request, which, in turn cause those servers or services to perform operations based on the request. For example, in the context of FIG. 1, the server 110A, in processing a request from a network device 105A, sends a message to an external resource server 140 to obtain information to help process the request.

In step 230, it is determined whether the processing of the request is complete. In various embodiments, the determination of whether the processing of the request is complete is performed by the server or a process communicatively coupled thereto. If the processing is complete, a substantive response is sent in step 240. In one embodiment, the response is constructed based on the processing that was performed on the request sent by the client or supplicant. In various embodiments, the response is sent via a network, FTP, HTTP, HTTPS, TCP/IP sockets, or other appropriate data transport mechanisms. In various embodiments, the response conforms to RADIUS, TACACS+, Diameter, EAP, Kerberos, HTTP, BEEP, or any other appropriate protocol. In various embodiments, the response is sent to the client or supplicant that sent the request.

In the context of FIG. 1, the server 110A monitors its own progress in processing the request. If the processing of the request is complete, then the AAA server 110A sends the network device 105A a RADIUS Access Response.

If the processing is not complete, then in step 250, it is determined whether an interim message should be sent. In various embodiments, the determination of whether an interim message should be sent is preformed by the server or a process communicatively coupled thereto. In one embodiment, determining whether an interim message should be sent involves estimating whether the response will arrive at the recipient after the recipient has already timed out that request. In various related embodiments, determining whether an interim message should be sent involves performing calculations to estimate the amount of time that will pass before a response for the request is ready or performing calculations that estimate how long the client or supplicant will wait before timeout. In related embodiments, determining whether an interim message should be sent involves comparing the estimated amount of time before the response is sent to the estimate of the amount of time that the client or supplicant will wait, a predefined threshold, etc.

In one embodiment, determining whether an interim message should be sent comprises determining whether the server is in a particular state for which interim messages are sent. In related embodiments, a particular state for which an interim message is sent includes receipt of the message, successful parsing of the message, initial processing of the message, sending a request to an external resource server, receiving a reply from an external resource server, CPU or memory usage on the server meeting certain criteria, the queue of messages awaiting response by the server meeting certain criteria, or any other appropriate state. In a related embodiments, the server keeps requests it has received in a queue, or the server monitors its CPU usage and memory usage using operating system calls.

In the context of FIG. 1, the server 110A monitors its own progress in processing the request. If the processing of the request is not complete, then the AAA server 110A determines whether to send an interim message by comparing an estimate of the amount of time that the response will take and an estimate of how long it is appropriate to make the client wait by considering, for example, an estimate of the timeout on the client.

If it is determined in step 250 that an interim message should not be sent, then the request is processed (step 220). In one embodiment, the request is continuously processed while steps 230, 240, 250, and 260 are performed. In a related embodiment, one process performs steps 230, 240, 250, and 260 and a different process performed step 220.

If it is determined in step 250 that an interim message should be sent, then in step 260, an interim message is sent to the client. Interim messages are described in detail above in the section entitled Interim Messages. In various embodiments, the interim message is sent by the server or a process communicatively coupled thereto. In various embodiments, the interim message is sent via a network, FTP, HTTP, HTTPS, TCP/IP sockets, or other appropriate data transport mechanisms. In one embodiment, the response is sent to the client or supplicant that sent the request.

In the context of FIG. 1, if the server 110A determines that it does not need to send an interim message to the network device 105A, then it does not send an interim message and continues to process the request.

If, on the other hand, the server 110A determines that it should send an interim message, then the AAA server 110A sends a RADIUS Access-Challenge containing an interim message to the network device 105A.

Various embodiments of FIG. 2 overcome the need for a client to use a fixed timeout mechanism and allow servers or processes communicatively coupled thereto to indicate to clients or processes communicatively coupled thereto to communicate information that the client can use to change its expectation of when a response to a request will arrive. These indications enable a client to make an informed decision about when to timeout particular requests. Moreover, various embodiments reduce the network traffic associated with timeout, failover, and reconnection by reducing the number of requests resends made by a requester.

Whereas FIG. 2 depicts a certain flow of events, the invention is not limited to these steps or this flow. Additional steps could be performed, steps could be left out, and the steps could be performed in parallel or in a different order.

Reacting to an Interim Message

Figure 3:
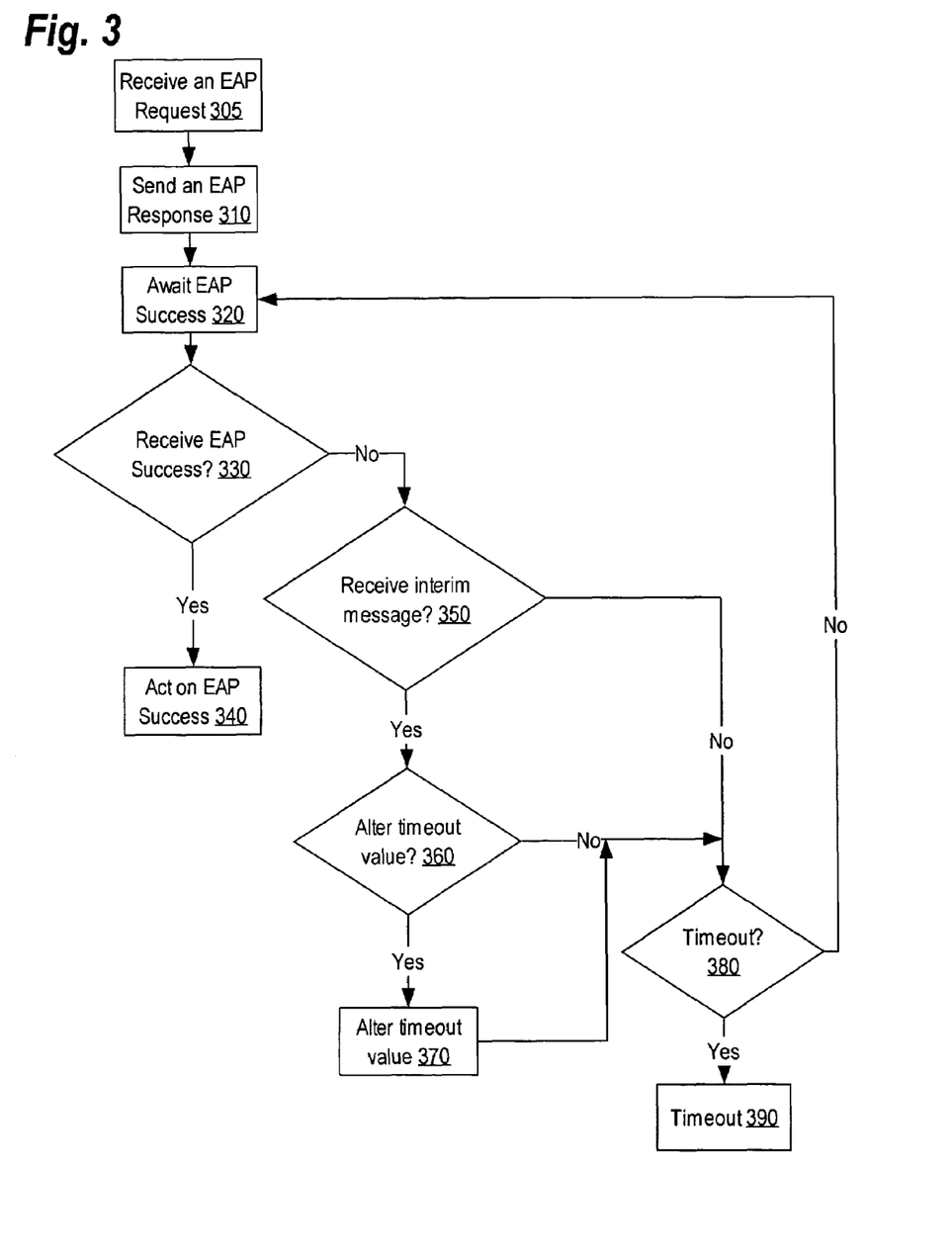
FIG. 3 depicts a flow diagram of an example method for determining appropriate reaction to an interim message.

FIG. 3 depicts a flow diagram of an example method for determining appropriate reaction to an interim message.

First, a request is sent in step 310. In various embodiments, a client or a process communicatively coupled thereto sends a request to a server or a process communicatively coupled thereto. In various embodiments, the request is sent via a network, FTP, HTTP, HTTPS, TCP/IP sockets, or other appropriate data transport mechanisms. In various embodiments, the request is sent in RADIUS, TACACS+, Diameter, EAP, Kerberos, HTTP, BEEP, or any other appropriate protocol.

Once the request has been sent (step 310) a response to that request is awaited (step 320). In various embodiments, the client or a process communicatively coupled thereto awaits the response. In various embodiments, the response is awaited by listening on an FTP, HTTP, HTTPS, or TCP/IP connection, or any other appropriate port or data transport mechanism interface.

In the context of FIG. 1 where, for example, a server 110A is an AAA server 110A and a network device 105A is an AAA client, the network device 105A sends a RADIUS Access Request to the AAA server 110A and awaits response to the request.

If a response is received, then in step 330, the response is acted upon (step 340). In various embodiments, the client or a process communicatively coupled thereto acts on the response. The actions performed based on the response are not crucial to the techniques described herein. In various embodiments, however, these include authenticating a user, not authenticating a user, or any other appropriate action.

If a response has not been received in step 330, then a check is made to determine whether an interim message has been received. In various embodiments, the client or a process communicatively coupled thereto determines whether an interim message has been received. In one embodiment, determining whether an interim message has been received includes parsing an incoming message and determining whether the message has an ID corresponding to the request. Details of the interim message are described above.

If an interim message is received in step 350, it is determined whether the timeout value for the request should be altered. In various embodiments, the timeout value for the request is stored in a memory accessible to the client or a process communicatively coupled thereto. In one embodiment, it is determined whether to alter the timeout value based on information stored in the interim message.

If it is determined that the timeout value should be altered, then the timeout value is altered in step 370. In various embodiments, the client or a process communicatively coupled thereto alters the timeout value that it maintains internally. In various embodiments, the timeout value is altered based on information in the interim message. In various related embodiments, the timeout value is altered to allow enough time for receipt of a subsequent interim message related to the request or for the response to the request. The alteration may be indicated by a suggested value provided by the server. In one embodiment, the interim message contains human-readable text describing the status of the message. In a related embodiment, the human-readable text is displayed to a human operator communicatively coupled to the client in order to inform the human-operator of the status of the response to the request.

In the context of FIG. 1, if the network device 105A receives an interim message in the form of a RADIUS Access Challenge, it parses the VSA containing the interim message. The network device 105A then determines, based on the interim message, that the timeout value for the request should be set to 30 seconds because the AAA server 110A has indicated in the interim message that the AAA server 110A will finish processing the request in less than 30 seconds.

If an interim message is not received, and whether or not the timeout value is altered, a check is made to determine whether a timeout is necessary (step 380). In one embodiment, determining whether a timeout is necessary involves comparing the amount of time that has elapsed since the request was sent to a timeout value stored on the client or a process communicatively coupled thereto. If timeout is necessary, the client or a process communicatively coupled thereto times out the message in step 390. In various embodiments, this can include failing over to a new server and sending the request to the new server, resending the request to the same server, or performing no action and discontinuing to await a response to the request.

In the context of FIG. 1, if the network device 105A has not received an interim message or a response to its request within the time dictated by its timeout value, then it times out and resends the request to the AAA server 110A.

If a timeout is not necessary, a response to the request is awaited (step 320). In one embodiment, a response to the request is awaited continuously. In various related embodiments, one process awaits a response to the request and one or more other processes perform steps 330, 340, 250, 360, 370, 380, and 390.

Various embodiments of FIG. 3 enable clients to react to an interim message related to a request. The clients, based on the interim message, can determine whether it is appropriate to change the timeout value for a response to the request (or for another interim message corresponding to the request) or whether to failover to an alternative server.

Whereas FIG. 3 depicts a certain flow of events, the invention is not limited to these steps or this flow. Additional steps could be performed, steps could be left out, and the steps could be performed in parallel or in a different order.

An Example Embodiment of Dynamic Timeout Using EAP Protocol

Below is an example embodiment according to one embodiment of the invention for an AAA server 110A with AAA clients (network devices) 105A, 105B, 105C and EAP supplicants 101A, 101B, 101C. The example is described in terms of FIGS. 1, 2, 3 and is supplied for illustrative purposes and in no way should be considered to limit the claims.

In this example, the EAP protocol is used for communication between the AAA server 110A and an EAP supplicant 101A. The network device 105A is an AAA client communicating with the AAA server using the RADIUS protocol. In various embodiments, the network device 105A communications with the EAP supplicant 101A using 802.11b, 802.11 g, or any other appropriate protocol. As part of the communication between the network device 105A and each of the AAA server 110A and the EAP supplicant 101A, the network device 105A forwards EAP messages between the AAA server 110A and the EAP supplicant 101A, but does not process the content of the EAP message. In various embodiments, the EAP messages communicated between the AAA server 110A and the EAP supplicant 101A are sent between the AAA server 110A and the network device 105A as content in a message in RADIUS or any other appropriate protocol. In various embodiments, the EAP messages communicated between the AAA server 110A and the EAP supplicant 101A are sent between the network device 105A and the EAP supplicant 101A as content in 802.11b's, 802.11g's, or any other appropriate protocol's messages. The net effect is that the EAP requests and responses are communicated between the EAP supplicant 101A and AAA server 110A. The process of sending a message between the EAP supplicant 101A and the AAA server 110A is described in detail below as "sending" and should be interpreted to include any appropriate method of performing communication including sending an EAP message as content in a message in any appropriate protocol including RADIUS, 802.11b, and 802.11g.

In step 305, the AAA server 110A sends an EAP Identity Request to the EAP supplicant 101A. The EAP supplicant 101A responds in step 310 and awaits an EAP Success message from the server in step 320. In various embodiments, other EAP request and response messages are sent between the EAP supplicant 101A and the AAA server 110A before the EAP supplicant 101A awaits the EAP Success message. As described above, communication between the EAP supplicant 101A and the AAA server 110A is performed via the network device 105A.

As described above, the AAA server receives the message (step 210) and performs the necessary processing before sending an EAP Success message (step 220). The AAA server 110A then determines whether the processing has occurred which will allow the sending of an EAP Success message (230). If an EAP Success message can be sent, then an EAP Success message is sent to the EAP supplicant 101A via the network device 105A (step 240). If the processing required for the EAP Success message is not complete, then the AAA server 110A determines whether it should send an interim message (step 250). As described above, determining whether an AAA server 110A should send an EAP supplicant 101A an interim message can be based on a number of factors, including a prediction as to whether the EAP supplicant 101A will timeout before the AAA server 110A has time to send the EAP supplicant 101A an EAP Success message.

If the AAA server determines that it does not need to send an interim message, then no interim message is sent to the EAP supplicant, and the AAA server continues processing (step 220). If the AAA server determines that it needs to send an interim message, then an interim message is sent to the EAP supplicant (step 260) and the server continues to perform the processing necessary before it can send the EAP Success message (step 220).

The interim message can be sent in any appropriate format using any appropriate communication mechanism. One example would be to format the interim message as a set of key-value pairs and embed them in an EAP Notification message. In one embodiment, the EAP Notification message is sent to the EAP supplicant 101A via the network device 105A using a RADIUS Access Challenge message. The RADIUS Access Challenge message is appropriate because it does not terminate the session between the network device 105A and the AAA server 110A.

If the EAP supplicant receives an EAP Success message from the AAA server (step 330), then the EAP supplicant acts on the EAP Success message (step 340). Exactly how the EAP supplicant reacts to the EAP Success message is not critical to the techniques described herein.

If the EAP supplicant receives an interim message from the AAA server (step 350), then the EAP supplicant determines whether it needs to alter a timeout value associated with receiving the EAP Success message (step 340). In various embodiments, the interim message contains information as to the state of the AAA server 110A, the time before the next interim message, the time before the EAP Success message will be sent, or any other appropriate information described herein. Based on the information in the interim message, the EAP supplicant 101A could, for example, reset the timeout value associated with the EAP Success message to be long enough to await the next interim message or the EAP Success (step 370).

Whether or not the timeout value is altered, the EAP supplicant checks to see whether the EAP Success message has timed out (step 380). If the EAP Success message has timed out, then the EAP supplicant will perform appropriate actions to time out the EAP Success message (step 390). The actions performed to timeout a message are not critical to the techniques herein described, but might include, for example, reinitiating an EAP session with the AAA server 110A or failing over to a different AAA server 110B.

If the EAP Request has not timed out, then the EAP supplicant continues to await an EAP Success message (step 320).

Functional Architecture

Figure 4:
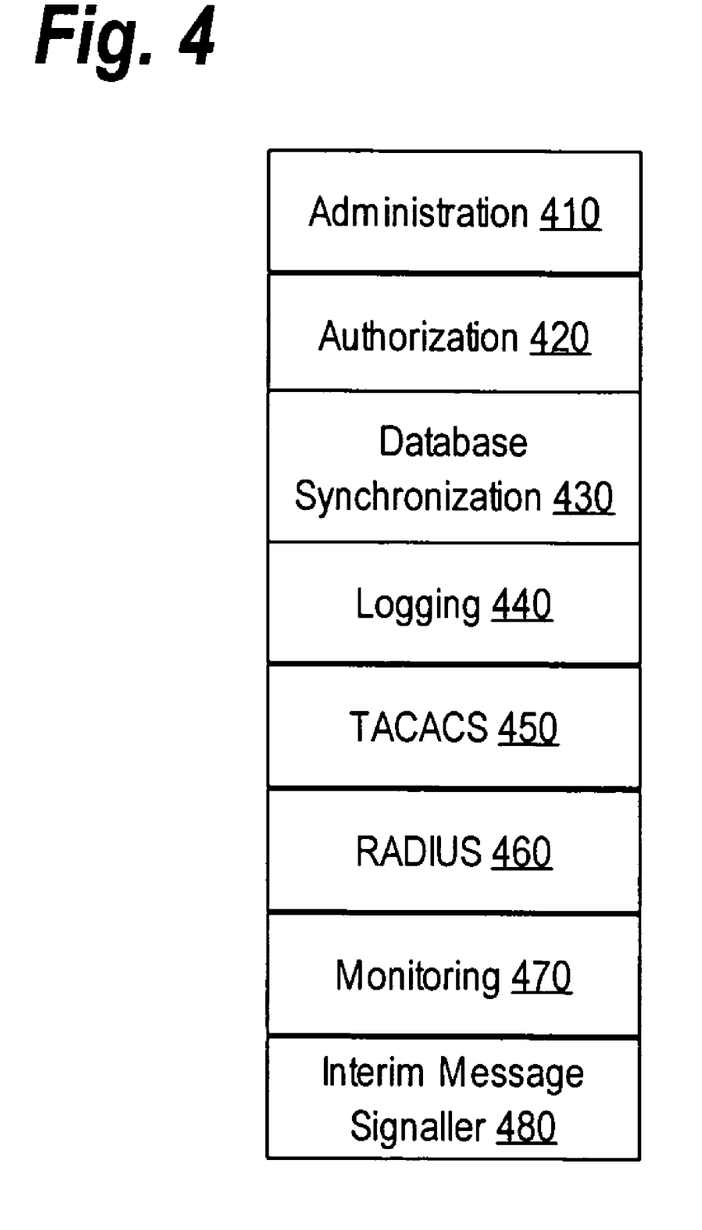
FIG. 4 depicts a block diagram of example architectural elements of an AAA server that performs the foregoing steps.

FIG. 4 depicts a block diagram of example architectural elements of an AAA server that performs the foregoing steps.

In various embodiments, a server has multiple services. The administration service 410 provides a built-in web server for AAA administration of the multiple simultaneous sessions within the server. The authorization service 420 authenticates users, grants or denies service privileges, manages AAA databases, and handles external database authentication forwarding. The database synchronization service 430 manages database synchronization and replication to other AAA servers. The logging service 440 monitors and records user and administrator activities and activities related to backups and restoration, database replication, synchronizations, TACACS+ and RADIUS communication, VoIP activities, and any other service accounting needed. The TACACS+ service 450 and RADIUS service 460 handle communication and parsing of messages passed among devices and services. The monitoring service 470, monitors status of AAA services and server resources, records and reports all critical errors to logs, sends e-mail alerts to administrators noting any potential problems, automatically detects and restarts AAA services, and scrutinizes login frequency of users.

The steps of FIG. 2 may be implemented in an interim message signaler 480. In various embodiments, the foregoing steps are performed by one or more of the services 410, 420, 430, 440, 450, 460, 470; are performed entirely by the service 480; or are performed by the service, 480, in combination with the services one or more of the services 410, 420, 430, 440, 450, 460, 470. For example, in the context of FIG. 1 where the server 110A is an AAA server, as part of the AAA server 110A, a monitoring service 470 provides information regarding the status of a request from network device 105A to an interim message signaler 480, and if sending an interim message is necessary, the interim message signaler 480 constructs an interim message to be sent by the RADIUS service 460 in a RADIUS Access Challenge VSA to the network device 105A to notify the network device 105A of the status of the response to the request.

The services listed in FIG. 4 do not assume any particular hardware configuration. The services can run as part of a single thread or process, can be separate threads or processes on the same physical computer, or can be running on multiple computers.

Hardware Overview

Figure 5:
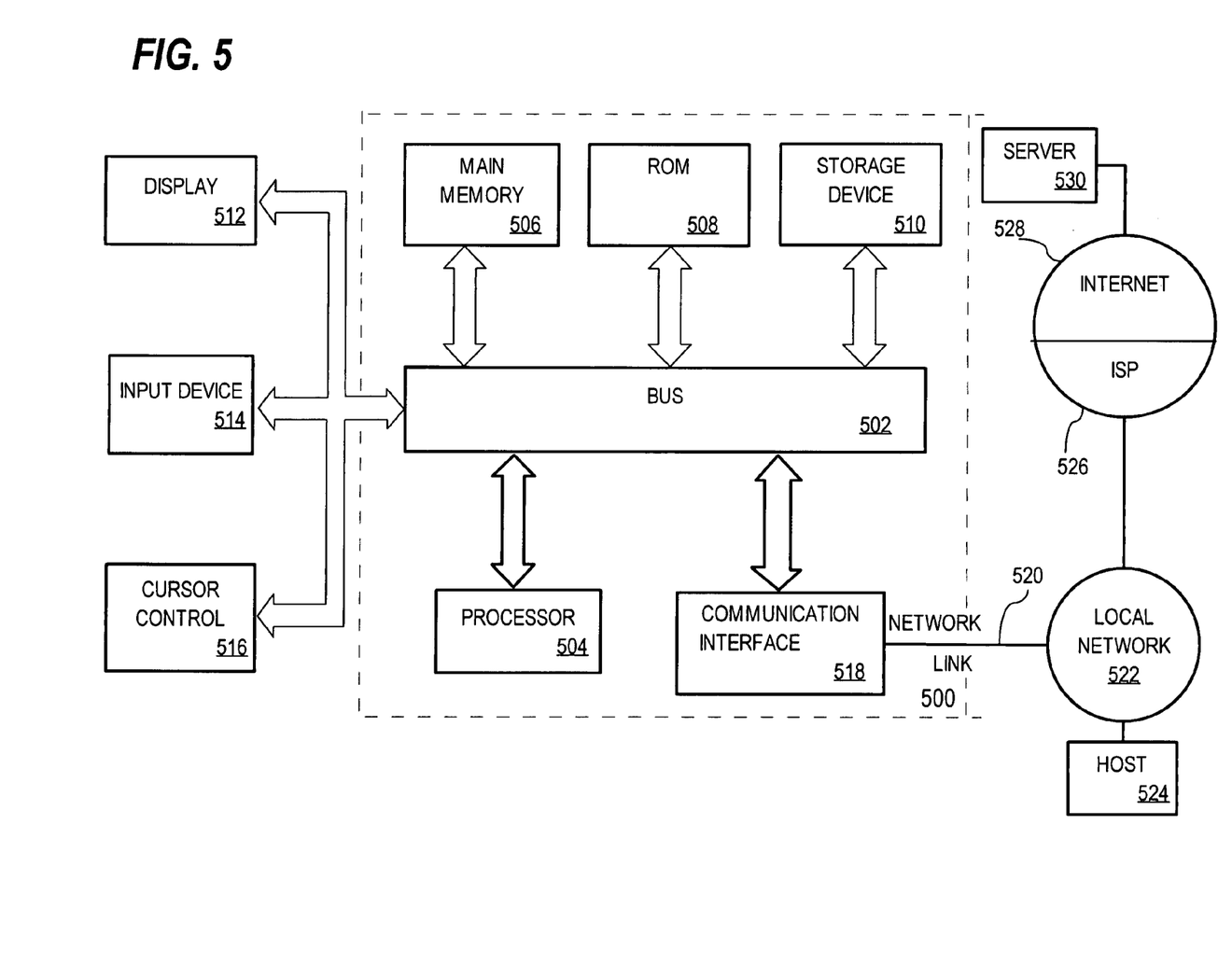
FIG. 5 is a block diagram that illustrates a computer system upon which an embodiment of the invention may be implemented.

FIG. 5 is a block diagram that illustrates a computer system upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a machine readable medium may take many forms, including but not limited to, machine storage media such as non-volatile media and volatile media and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, machine storage media including a floppy disk, a flexible disk, hard disk, magnetic tape, or any other magnetic medium, a CD-ROM, any other optical medium. Other forms of machine readable media may include punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for dynamic timeout comprising machine-implemented steps of:
   receiving a request from a requestor at a server or a process communicatively coupled thereto;
   determining whether an interim message should be sent to the requestor;
   wherein the interim message contains information regarding what the server is doing to process the client's request, during a time period in which it is not yet possible for the server to provide a more substantive response; and
   if the interim message should be sent to the requestor, sending to the requestor the interim message referring to the request, wherein the interim message contains response-related items, comprising:
      if processing the request involves multiple steps, an indication of which steps of the multiple steps have already been performed; and
      if processing the request involves sending a second request to an external resource server, an indication of the status of the second request.

2. The method of claim 1, wherein the response-related items further comprise one or more of:
   time estimate related to sending a response to the request;
   time estimate related to sending a subsequent interim message related to the request;
   an indication that the request has been received by the server or the process communicatively coupled thereto, and an indication that describing whether the request is well formatted;
   an indication of the state that the server is in.

3. The method of claim 1, wherein the step of determining whether the interim message should be sent to the requestor comprises determining whether one or more of the following has occurred:
   the request has been received;
   the request has been successfully parsed;
   the server has begun processing the request;
   CPU usage of the server meets certain criteria;
   memory usage of the server meets certain criteria; and
   a queue of messages awaiting response by the server meets certain criteria.

4. The method of claim 1, wherein the step of determining whether the interim message should be sent to the requestor comprises determining whether a second request has been sent to an external resource server.

5. The method of claim 1, wherein the step of determining whether the interim message should be sent to the requestor comprises determining whether a second response to a second request has been received at the server from an external resource server.

6. A method for dynamic timeout comprising machine-implemented steps of:
   sending a request to a server located within an arrangement of one or more servers communicatively coupled to a network;
   receiving an interim message from the server, wherein the interim message contains one or more response-related items; and
   determining whether to change a timeout value based on the one or more response-related items in the interim message;
   wherein the interim message contains information regarding what the server is doing to process the client's request, during a time period in which it is not yet possible for the server to provide a more substantive response;
   wherein the response-related items comprise:
      if processing the request involves multiple steps, an indication of which steps of the multiple steps have already been performed; and
      if processing the request involves sending a second request to an external resource server, an indication of the status of the second request.

7. The method of claim 6, wherein the response-related items comprise one or more of:
   time estimate related to sending a response to the request;
   time estimate related to sending a subsequent interim message related to the request;
   an indication that the request has been received by the server or a process communicatively coupled thereto, and an indication describing whether the request is well formatted;
   an indication of the state that the server is in.

8. A machine storage medium storing sequences of instructions for dynamic timeout, which instructions, when executed by one or more processors, cause the one or more processors to carry out the steps of:
   receiving a request from a requestor at a server within an arrangement of one or more servers communicatively coupled to a network or a process communicatively coupled thereto;
   determining whether an interim message should be sent to the requestor;
   wherein the interim message contains information regarding what the server is doing to process the client's request, during a time period in which it is not yet possible for the server to provide a more substantive response; and
   if the interim message should be sent to the requestor, sending to the requestor the interim message referring to the request, wherein the interim message further contains response-related items, comprising
      if processing the request involves multiple steps, an indication of which steps of the multiple steps have already been performed; and if processing the request involves sending a second request to an external resource server, an indication of the status of the second request.

9. The machine storage medium as recited in claim 8, wherein the instructions, when executed by one or more processors, cause the one or more processors to act as an AAA server and wherein the requestor is an AAA client, the request is a RADIUS Access Request message, and the interim message is a RADIUS Access Challenge message that contains the one or more response-related items in a Vendor Specific Attribute in the RADIUS Access Challenge message.

10. The machine storage medium as recited in claim 8, wherein the instructions, when executed by one or more processors, cause the one or more processors to act as an AAA server and wherein the requestor is an EAP supplicant, the request is an EAP Request, and the interim message is an EAP Notification message that contains the response-related items.

11. A machine storage medium storing sequences of instructions for dynamic timeout, which instructions, when executed by one or more processors, cause the one or more processors to carry out the steps of:
    sending a request to a server;
    receiving an interim message from the server, wherein the interim message contains information regarding what the server is doing to process the client's request, during a time period in which it is not yet possible for the server to provide a more substantive response;
    wherein the interim message further contains response-related items; and
    determining whether to change a timeout value based on the response-related items in the interim message, comprising:
        if processing the request involves multiple steps, an indication of which steps of the multiple steps have already been performed; and
        if processing the request involves sending a second request to an external resource server, an indication of the status of the second request.

12. The machine storage medium as recited in claim 11, wherein the instructions, when executed by the one or more processors, cause the one or more processors to act as an AAA client and wherein the server is an AAA server, the request is a RADIUS Access Request message, and the interim message is a RADIUS Access Challenge message that contains response-related items in a Vendor Specific Attribute in the RADIUS Access Challenge message.

13. The machine storage medium as recited in claim 11, wherein the instructions, when executed by the one or more processors, cause the one or more processors to act as an EAP supplicant and the server is an AAA server, the request is an EAP Request, and the interim message is an EAP Notification message that contains response-related items.

14. An apparatus for dynamic timeout, comprising:
    a network interface that is coupled to a data network for receiving one or more packet flows therefrom;
    a processor;
    one or more stored sequences of instructions which, when executed by the processor, cause the processor to carry out the steps of:
    receiving a request from a requestor at a server or the process communicatively coupled thereto;
    determining whether an interim message should be sent to the requestor;
    wherein the interim message comprises information regarding what the server is doing to process the client's request, during a time period in which it is not yet possible for the server to provide a more substantive response; and
    if the interim message should be sent to the requestor, sending to the requestor the interim message referring to the request, wherein the interim message contains response-related items, comprising:
        if processing the request involves multiple steps, an indication of which steps of the multiple steps have already been performed; and
        if processing the request involves sending a second request to an external resource server, an indication of the status of the second request.

15. The apparatus of claim 14, wherein the apparatus is an AAA server and wherein the requestor is an AAA client, the request is a RADIUS Access Request message, and the interim message is a RADIUS Access Challenge message that contains the response-related items in a Vendor Specific Attribute in the RADIUS Access Challenge message.

16. The apparatus of claim 14, wherein the apparatus is an AAA server and wherein the requestor is an EAP supplicant, the request is an EAP Request, and the interim message is an EAP Notification message that contains the response-related items.

17. An apparatus for dynamic timeout, comprising:
    a network interface that is coupled to a data network for receiving one or more packet flows therefrom;
    a processor;
    one or more stored sequences of instructions which, when executed by the processor, cause the processor to carry out the steps of:
    sending a request to a server;
    receiving an interim message from the server, wherein the interim message contains response-related items; and
    wherein the interim message further comprises information regarding what the server is doing to process the client's request, during a time period in which it is not yet possible for the server to provide a more substantive response;
    determining whether to change a timeout value based on the response-related items in the interim message, comprising:
        if processing the request involves multiple steps, an indication of which steps of the multiple steps have already been performed; and
        if processing the request involves sending a second request to an external resource server, an indication of the status of the second request.

18. The apparatus of claim 17, wherein the apparatus is an AAA client and wherein the server is an AAA server, the request is a RADIUS Access Request message, and the interim message is a RADIUS Access Challenge message that contains response-related items in a Vendor Specific Attribute in the RADIUS Access Challenge message.

19. The apparatus of claim 17, wherein the apparatus is an EAP supplicant and wherein the server is an AAA server, the request is an EAP Request, and the interim message is an EAP Notification message that contains response-related items.

20. An apparatus for dynamic timeout, comprising:
    means for receiving a request from a requestor at a server or a process communicatively coupled thereto;
    means for determining whether an interim message should be sent to the requestor, wherein the interim message contains information regarding what the server is doing to process the client's request, during a time period in which it is not yet possible for the server to provide a more substantive response; and means for sending to the requestor, if the interim message should be sent to the requestor, the interim message referring to the request, wherein the interim message contains response-related items, comprising:
- if processing the request involves multiple steps, an indication of which steps of the multiple steps have already been performed; and
- if processing the request involves sending a second request to an external resource server, an indication of the status of the second request.

21. The apparatus of claim 20, wherein the means for performing the steps is an AAA server and wherein the requestor is an AAA client, the request is a RADIUS Access Request message, and the interim message is a RADIUS Access Challenge message that contains the response-related items in a Vendor Specific Attribute in the RADIUS Access Challenge message.

22. The apparatus of claim 20, wherein the means for performing the steps is an AAA server and wherein the requestor is an EAP supplicant, the request is an EAP Request, and the interim message is an EAP Notification message that contains the response-related items.

23. An apparatus for dynamic timeout, comprising:
means for sending a request to a server;
means for receiving an interim message from the server, wherein the interim message contains information regarding what the server is doing to process the client's request, during a time period in which it is not yet possible for the server to provide a more substantive response; and further wherein the interim message contains response-related items; and
means for determining whether to change a timeout value based on the response-related items in the interim message, comprising:
- if processing the request involves multiple steps, an indication of which steps of the multiple steps have already been performed; and
- if processing the request involves sending a second request to an external resource server, an indication of the status of the second request.

24. The apparatus of claim 23, wherein the means for performing the steps is an AAA client and wherein the server is an AAA server, the request is a RADIUS Access Request message, and the interim message is a RADIUS Access Challenge message that contains response-related items in a Vendor Specific Attribute in the RADIUS Access Challenge message.

25. The apparatus of claim 23, wherein the means for performing the steps is an AAA client and wherein the server is an AAA server, the request is an EAP Request, and the interim message is an EAP Notification message that contains response-related items.

26. A method for dynamic timeout for an AAA server comprising machine-implemented steps of:
receiving a request from a requestor at an AAA server or a process communicatively coupled thereto;
determining whether an interim message should be sent to the requestor, wherein the interim message contains information regarding what the server is doing to process the client's request, during a time period in which it is not yet possible for the server to provide a more substantive response; and
if the interim message should be sent to the requestor, sending to the requestor the interim message referring to the request, wherein the interim message contains response-related items, comprising:
- if processing the request involves multiple steps, an indication of which steps of the multiple steps have already been performed; and
- if processing the request involves sending a second request to an external resource server, an indication of the status of the second request.

27. The method of claim 26, wherein the requestor is an AAA client, the request is a RADIUS Access Request message, and the interim message is a RADIUS Access Challenge message that contains the response-related items in a Vendor Specific Attribute in the RADIUS Access Challenge message.

28. The method of claim 26, wherein the requestor is an EAP supplicant, the request is an EAP Request, and the interim message is an EAP Notification message that contains the response-related items.

29. A method for dynamic timeout comprising machine-implemented steps of:
sending a request to an AAA server located within an arrangement of one or more servers communicatively coupled to a network;
receiving an interim message from the AAA server, wherein the interim message contains information regarding what the server is doing to process the client's request, during a time period in which it is not yet possible for the server to provide a more substantive response, and further wherein the interim message contains response-related items; and
determining whether to change a timeout value based on the response-related items in the interim message, comprising:
- if processing the request involves multiple steps, an indication of which steps of the multiple steps have already been performed; and
- if processing the request involves sending a second request to an external resource server, an indication of the status of the second request.

30. The method of claim 29, wherein the steps are performed by an AAA client, the request is a RADIUS Access Request message, and the interim message is a RADIUS Access Challenge message that contains response-related items in a Vendor Specific Attribute in the RADIUS Access Challenge message.

31. The method of claim 29, wherein the steps are performed by an EAP supplicant, the request is an EAP Request, and the interim message is an EAP Notification message that contains response-related items.

* * * * *